May 12, 1931.  F. L. FULLER  1,804,464
MAGNIFYING DEVICE
Filed June 27, 1928  2 Sheets-Sheet 1

Inventor
Frederick L. Fuller
By his Attorney
W. M. Wilson

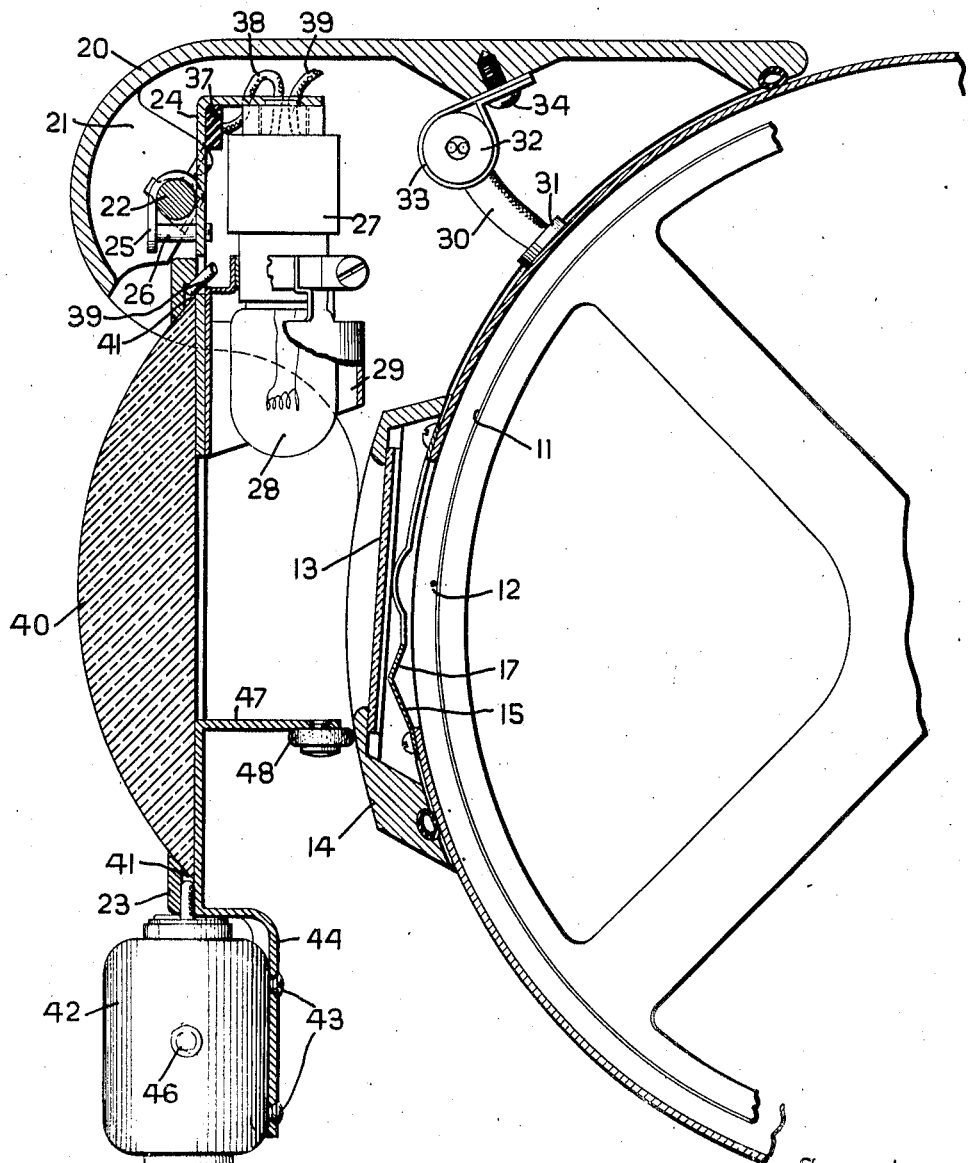

Patented May 12, 1931

1,804,464

UNITED STATES PATENT OFFICE

FREDERICK L. FULLER, OF TRENTON, NEW JERSEY, ASSIGNOR TO DAYTON SCALE COMPANY, OF DAYTON, OHIO, A CORPORATION OF NEW JERSEY

MAGNIFYING DEVICE

Application filed June 27, 1928. Serial No. 288,603.

This invention relates to scales, especially of the computing type provided with a rotatable drum chart.

The object of the invention is to provide an improved magnifying device for facilitating reading of the chart.

Another object of the invention is to provide an illuminating device for said chart and a novel control means therefor.

Another object is also the provision of a switch for said illuminating device which is adapted to serve as a handle to manipulate the magnifying device.

Further, the object of the invention is the provision of novel means for carrying lead wires to said illuminating device.

Still further, an object is the provision of a novel guard and support for said magnifying device.

Further and other objects and advantages will be hereinafter set forth in the accompanying specification and claims, and shown in the drawings, which by way of illustration show what is now considered to be the preferred embodiment of the invention.

Fig. 2 is a section on line 2—2 of Fig. 1.

Figure 1:
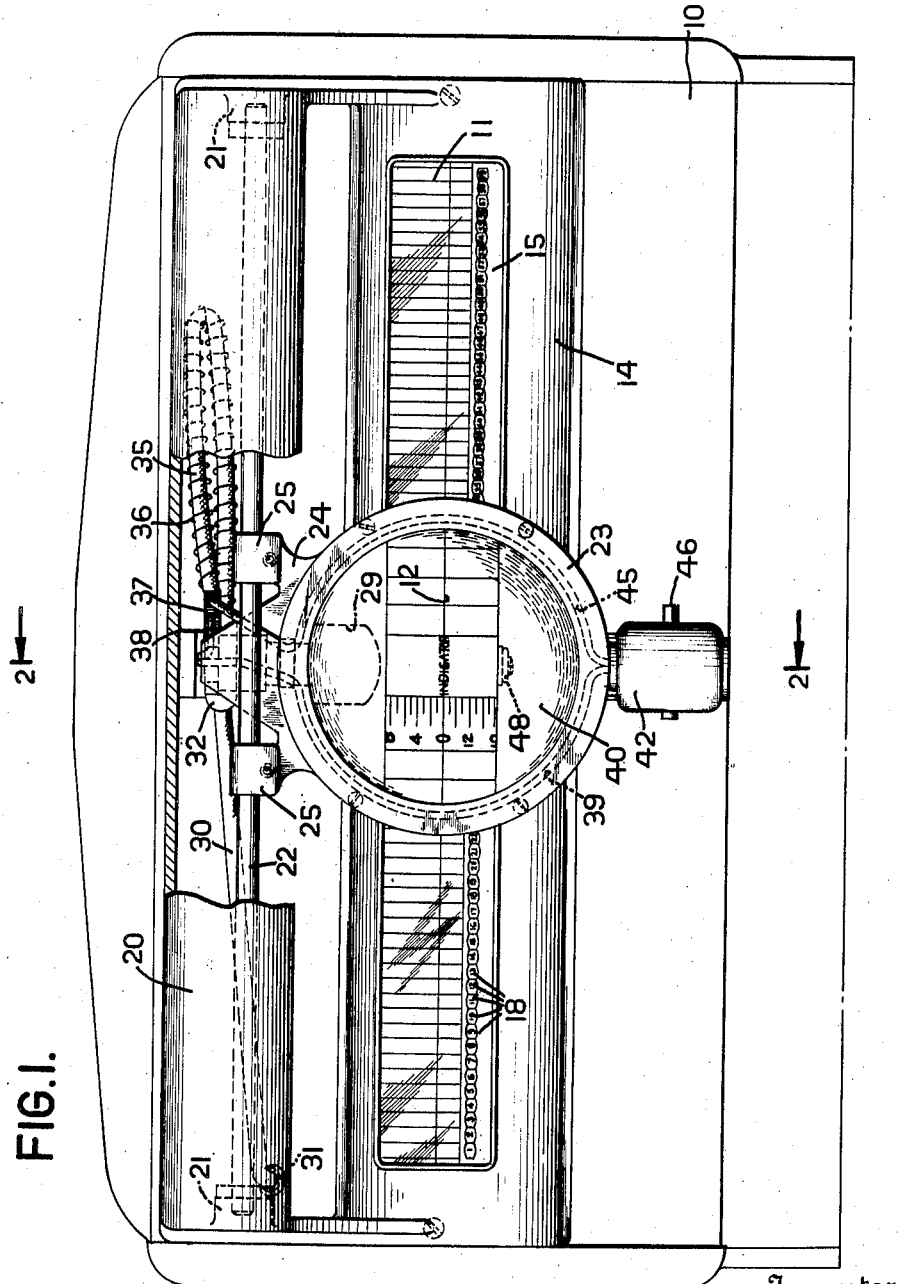
Fig. 1 is a front view of the upper part of the scale.

Referring to the drawings in detail, 10 is the casing enclosing the indicating drum 11 provided with the weight and price values in the usual manner. When a load is placed on the platform (not shown) the drum is caused to rotate until the weight and price values proportional to the load come opposite an indicator wire 12. The reading may be viewed through a plate glass window 13 covering the front of a housing 14 extending substantially the length of the drum casing and fixed thereto. A plate 15 of spring material extends along the length of the housing 14 and is fixed to the drum casing at its ends. The plate is provided with a longitudinal portion 17 on which is inscribed the rates 18 corresponding to the vertical rows of total prices inscribed on the drum chart.

In order to magnify the readings and to confine the range or vision to as few rows of total prices as convenient, a magnifying device is provided comprising the following construction.

Rigidly connected with the housing 14 is a hollow frame 20 formed with a boss 21 at each end for supporting a round bar 22. A magnifying lens support is provided which comprises a front circular frame 23 and a rear retaining plate 24 attached thereto having a pair of hanger lugs 25 extending forwardly thereof. The lugs 25 are freely rotatably mounted on rod 22 and serve to slidably support frame 23 for movement along rod 22. Removable pins 26 extend across the bottom of the lugs 25 and serve to prevent accidental removal of the lens support from the rod 22. Between lugs 25, the upper portion of plate 24 tapers towards the top and is there bent at right angles to extend horizontally. Attached to this horizontal portion is a lamp socket 27 carrying a lamp 28, the light from which is directed towards the drum chart by a reflector 29 clamped to the lamp socket. A cable 30 emerges from the drum chart casing 10 at 31 and is connected to one end of a plug 32 which is clamped tightly to the frame 20 midway of its ends by a clamp 33 attached to the frame by a screw 34. Connected to the other end of the plug is a cable 35 having a spring wire 36 coiled about its length constantly urging the cable upwardly and out of the path of the lens support. The wires emerging from the cable 35 pass through a plate 37 of insulating material which is fixed to the back of extension 24. One of the wires 38 enters the socket 27 and is connected to a terminal thereof. A lead 39 from the other socket terminal emerges from the upper end of the socket and is directed towards the lens support which has fixed therein the magnifying lens 40. The lead wire 39 is passed around one side of the magnifying glass in the space 41 between the glass and the inner periphery of the frame 23 and is clamped tightly therein by the retaining plate 24. The end of the wire is connected to one terminal of an ordinary snap switch 42 attached by screws 43 to a lower extension 44 of the plate 24.

The other wire 45 of the cable 35 emerges therefrom and passes directly around the space 41 at the opposite side from wire 39. The end of wire 45 is connected to the other terminal of the snap switch. Current may be supplied by wet or dry battery cells located in the scale housing or may be taken directly from the ordinary power lines. The plug 46 of the snap switch is operated to turn the current in lamp 28 on and off. At the same time, the body of the snap switch serves as a handle for sliding the magnifying device along the bar 22.

A horizontal portion 47 of the plate 24 is provided with a freely rotatable roller 48 the contact of which with the casing 14 limits the movement of the lens support towards the casing and serves to provide a rolling contact between said support and said casing when the support is slid along rod 22.

The operation of the parts above described should be obvious. To summarize briefly, drum 11 having been rotated in proportion to the load, in a manner well known, the magnifying device is grasped by the snap switch 42 at which time the button 46 may be operated to turn the light on. The magnifying device is moved until it covers the total price row on the chart which corresponds to the desired price per pound of the article as indicated by the chart 18. The computed value is then indicated, greatly magnified, by the indicator line 12. During the movement of the magnifying device in either direction, the spring wire 36 keeps the cable 35 in its uppermost position, thus preventing accidental interference thereof with the movement of the magnifying device.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore by the scope of the following claims:

1. Apparatus comprising a scale chart and a magnifying device therefor, said device comprising a magnifying lens, a frame for said lens, means for movably supporting said frame, an illuminating device carried by said frame, a cable carrying wire connections for said illuminating device, and means for holding the cable out of the path of said frame.

2. Apparatus comprising a scale chart and a magnifying device therefor, said device comprising a magnifying lens, a frame for said lens, means for movably supporting said frame, an illuminating means, a cable carrying connections for said illuminating means, and a coiled spring surrounding said cable for holding it out of the path of the lens frame.

3. Apparatus comprising a scale chart, a magnifying device therefor, a guard covering a portion of said scale chart, a hollow member rigidly carried by said guard, a rail, means for supporting the rail within the interior of the hollow member, said hollow member concealing said rail from view, and means for slidably supporting said magnifying device on said rail.

4. Apparatus comprising a graduated chart, a magnifying lens for said chart, a movable carrier for said lens, a lamp, a switch for said lamp mounted on said carrier, and wires from the switch to the lamp surrounding said lens and contained within said carrier.

5. Apparatus comprising a graduated chart, a magnifying lens, a support for said lens comprising a front frame and a retaining ring attached to the front frame, a lamp, a switch carried by said support, and wires extending from said switch to said lamp, said wires surrounding said lens and clamped between said front frame and said retaining ring.

6. Apparatus comprising a scale chart, a housing therefor, a guard frame attached to said housing and provided with an opening through which the chart may be viewed, a chart reading device and a convexly curved frame portion rigid with said guard frame and extending forwardly thereof and having means in the interior thereof for movably supporting said reading device.

7. In a scale including a chart and a reading device, a frame comprising a guard plate provided with an opening through which the chart may be viewed and a housing rigid with said plate and extending above and forwardly thereof, and means in the interior of the housing adapted to carry said reading device.

8. In a scale, a chart, a housing therefor, a reading device for the chart, a hollow frame rigidly carried by the housing, and a rail mounted in said frame and within the hollow thereof for pivotally suspending said reading device from said frame.

9. In a scale, a chart having a plurality of rows of indications, a reading device for said chart indications, a rail for carrying said device, and a one-piece frame comprising a support for a price scale indicating plate mounted in juxtaposition to said rows of indications and a housing above the plate for supporting said rail, the housing overhanging and masking the rail from view.

10. In a scale, a chart, a housing therefor provided with an opening through which a portion of the chart is visible, a stationary hollow frame carried by the housing and extending along said opening, a reading device for the chart, means within the interior of said hollow frame and concealed by the latter for supporting said reading device for movement relative to the hollow frame, and a member connected to the reading device for moving the latter on its supporting means, said member being exterior of and on the side of the chart adjacent the front of the hollow frame.

11. In a scale, a drum chart, a cylindrical housing therefor provided with a sight window for the chart extending axially of the latter, a hollow frame stationarily carried by the housing and extending along the sight window, an optical device for reading and magnifying the chart indications, means within the interior of said hollow frame and concealed by the latter for slidably supporting the reading device for movement relative to said frame along the sight window and a member connected to the reading device and on the side of the chart adjacent the front of the hollow frame for moving the reading device on its supporting means.

12. In a scale, a drum chart, a cylindrical housing therefor provided with a sight window for the chart extending axially of the latter, a hollow frame provided on the exterior of the housing and having the walls thereof parallel to the sight window, an optical device for reading and magnifying the chart indications, means within the interior of said hollow frame for slidably supporting the reading device for movement relative to said frame along the sight window, said reading device being operable from the side of the chart adjacent the front of the hollow frame for moving the reading device on its supporting means.

In testimony wherof I hereto affix my signature.

FREDERICK L. FULLER.